United States Patent
Qiu (10) Patent No.: US 12,526,482 B2
(45) Date of Patent: Jan. 13, 2026

(54) METHOD, WEB-BASED CLIENT, AND APPLICATION CLIENT FOR DISPLAYING PRODUCTS IN LIVESTREAMING

(71) Applicant: SHANGHAI BILIBILI TECHNOLOGY CO., LTD., Shanghai (CN)

(72) Inventor: Feng Qiu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 202 days.

(21) Appl. No.: 18/513,442

(22) Filed: Nov. 17, 2023

(65) Prior Publication Data

US 2024/0171822 A1 May 23, 2024

(30) Foreign Application Priority Data

Nov. 18, 2022 (CN) .......................... 202211447624.9

(51) Int. Cl.
*H04N 21/4722* (2011.01)
*H04N 21/2187* (2011.01)
(Continued)

(52) U.S. Cl.
CPC ..... *H04N 21/4722* (2013.01); *H04N 21/2187* (2013.01); *H04N 21/47815* (2013.01); *H04N 21/8586* (2013.01)

(58) Field of Classification Search
CPC ........... H04N 21/4722; H04N 21/2187; H04N 21/47815; H04N 21/8586
(Continued)

(56) References Cited

U.S. PATENT DOCUMENTS

2011/0106662 A1*  5/2011  Stinchcomb ........... G06Q 50/01
                                                    715/757
2013/0167208 A1*  6/2013  Shi ......................... H04L 63/18
                                                    726/5
(Continued)

FOREIGN PATENT DOCUMENTS

CN       113298590 A      8/2021
CN       113469791 A      10/2021
(Continued)

OTHER PUBLICATIONS

China Patent Application No. 202211447624.9; Office Action; dated Jul. 29, 2025; 23 pages.

*Primary Examiner* — Adil Ocak
(74) *Attorney, Agent, or Firm* — BakerHostetler (57) ABSTRACT

This application describes techniques for displaying products in livestreaming. The techniques comprise displaying a first interface in response to a display request triggered by operating a preset icon on a web-based livestreaming page, wherein the first interface comprises product information and at least one view button corresponding to at least one product; and displaying a second interface in response to a view request triggered by operating the at least one view button, wherein the second interface comprises an identification code, wherein the identification code is configured to be scanned by a mobile terminal and to enter an application-based livestreaming page corresponding to the web-based livestreaming page, wherein the application-based livestreaming page and the web-based livestreaming page are associated with a live room of a same online streamer, and wherein the application-based livestreaming page comprises detailed information of a product.

20 Claims, 3 Drawing Sheets

(51) Int. Cl.
*H04N 21/478* (2011.01)
*H04N 21/858* (2011.01)

(58) Field of Classification Search
USPC .......................................................... 725/60
See application file for complete search history.

(56) References Cited

U.S. PATENT DOCUMENTS

| 2022/0164864 A1* | 5/2022 | Li ........................ G06F 16/958 |
| 2024/0013199 A1* | 1/2024 | Marshall ............ G06Q 20/3274 |
| 2024/0144338 A1* | 5/2024 | Lockett .................. G06V 10/70 |

FOREIGN PATENT DOCUMENTS

| CN | 113486265 A | 10/2021 |
| CN | 113992619 A | 1/2022 |
| CN | 115086685 A | 9/2022 |

* cited by examiner

METHOD, WEB-BASED CLIENT, AND APPLICATION CLIENT FOR DISPLAYING PRODUCTS IN LIVESTREAMING

CROSS-REFERENCE TO RELATED APPLICATION

The present application claims priority to Chinese Patent Application No. 202211447624.9, filed on Nov. 18, 2022, which is incorporated herein by reference in its entirety.

BACKGROUND

With popularization of Internet technologies, network livestreaming is being accepted and loved by more people. In network livestreaming, an online streamer can provide an audience with multimedia content and receive feedback from the audience by using a live platform. Improvements in livestreaming scheduling are desired.

SUMMARY

In view of the foregoing problems, embodiments of this application are proposed to provide a method, a web-based client, and an application client for displaying a product in livestreaming that overcome the foregoing problems or at least partially resolve the foregoing problems.

According to a first aspect of the embodiments of this application, a method for displaying a product in livestreaming is provided, including:
  displaying a product list page in response to a display request triggered by operating a preset icon on a web-based livestreaming page, where the product list page includes product information and a view button corresponding to a product; and
  displaying an identification code page in response to a view request triggered by operating the view button, where the identification code page includes an identification code, so that a mobile terminal scans the identification code and enters a corresponding application-based livestreaming page, and the application-based livestreaming page further displays a detail page of the product.

Optionally, the displaying a product list page in response to a display request triggered by operating a preset icon on a web-based livestreaming page further includes:
  determining a live room corresponding to the web-based livestreaming page in response to the display request triggered by operating the preset icon on the web-based livestreaming page; and
  determining, based on the live room, product information associated with the live room, and displaying a product list page that includes the product information, where the product list page further includes a view button corresponding to a product.

Optionally, the product information included on the product list page is related to the live room, and product list pages displayed in a same live room include same product information.

Optionally, before the displaying a product list page in response to a display request triggered by operating a preset icon on a web-based livestreaming page, the method further includes:
  determining whether the live room corresponding to the web-based livestreaming page is associated with product information; and
  displaying the preset icon on the web-based livestreaming page if the live room corresponding to the web-based livestreaming page is associated with product information.

Optionally, the displaying an identification code page in response to a view request triggered by operating the view button further includes:
  determining live room information and corresponding product information in response to the view request triggered by operating the view button corresponding to the product; and
  generating a corresponding identification code based on the live room information and the product information, and displaying the identification code on the identification code page.

Optionally, the generating a corresponding identification code based on the live room information and the product information, and displaying the identification code on the identification code page further includes:
  generating the corresponding identification code based on the live room information, the product information, and source channel information, and displaying the identification code on the identification code page, where the source channel information includes web-based livestreaming.

According to a second aspect of the embodiments of this application, a method for displaying a product in livestreaming is provided, including:
  identifying and determining, in response to a request triggered by scanning an identification code, live room information and product information that are included in the identification code; and
  determining a corresponding live room based on the live room information, displaying an application-based livestreaming page of the live room, and displaying a detail page of a product based on the product information, where the detail page is displayed on the application-based livestreaming page.

Optionally, the determining a corresponding live room based on the live room information, displaying an application-based livestreaming page of the live room, and displaying a detail page of a product based on the product information further includes:
  determining a url address of application-based livestreaming corresponding to the live room based on the live room information, and displaying the application-based livestreaming page of the live room based on the url address; and
  determining detailed information of the product based on the product information, and displaying a detail page that is of the product and that includes the detailed information of the product.

Optionally, the identifying and determining, in response to a request triggered by scanning an identification code, live room information and product information that are included in the identification code further includes:
  in response to the request triggered by scanning the identification code, blocking login user verification on a user, and identifying and determining the live room information and the product information that are included in the identification code.

According to a third aspect of the embodiments of this application, a web-based client for displaying a product in livestreaming is provided, including:
  a first response means, configured to display a product list page in response to a display request triggered by operating a preset icon on a web-based livestreaming page, where the product list page includes product information and a view button corresponding to a product; and a second response means, configured to display an identification code page in response to a view request triggered by operating the view button, where the identification code page includes an identification code, so that a mobile terminal scans the identification code and enters a corresponding application-based livestreaming page, and the application-based livestreaming page further displays a detail page of the product.

According to a fourth aspect of the embodiments of this application, an application client for displaying a product in livestreaming is provided, including:

an identification means, configured to identify and determine, in response to a request triggered by scanning an identification code, live room information and product information that are included in the identification code; and a display means, configured to: determine a corresponding live room based on the live room information, display an application-based livestreaming page of the live room, and display a detail page of a product based on the product information, where the detail page is displayed on the application-based livestreaming page.

According to a fifth aspect of the embodiments of this application, a computing device is provided, including a processor, a memory, a communications interface, and a communications bus. The processor, the memory, and the communications interface communicate with each other through the communications bus.

The memory is configured to store at least one executable instruction. The executable instruction enables the processor to perform an operation corresponding to the method for displaying a product in livestreaming.

According to a sixth aspect of the embodiments of this application, a computer storage medium is provided. The storage medium stores at least one executable instruction, and the executable instruction enables a processor to perform an operation corresponding to the method for displaying a product in livestreaming.

According to the method, the web-based client, and the application client for displaying a product in livestreaming that are provided in this application, the product list page is displayed on the web-based livestreaming page, and the product information is displayed to the user, so that the user can intuitively learn of each product in livestreaming, to improve interest of the user in the product. The user may select the product information based on a requirement of the user, and scan the displayed identification code to enter the application-based livestreaming page, to drive traffic from web-based livestreaming to application-based livestreaming, and help the user subsequently perform an operation on the application-based livestreaming page.

The foregoing description is merely an overview of the technical solutions of this application. To better understand the technical means of this application, the technical means may be implemented based on content of this specification. In addition, to make the foregoing and other objects, features, and advantages of this application clearer and easier to understand, the following describes a specific implementation of this application.

BRIEF DESCRIPTION OF DRAWINGS

Other advantages and benefits become apparent to a person of ordinary skill in the art by reading the following detailed descriptions of preferred implementations. The accompanying drawings are merely intended to describe the preferred implementations, but not intended to limit this application. In addition, throughout the accompanying drawings, same reference symbols are used to denote same components. In the accompanying drawings.

DESCRIPTION OF EMBODIMENTS

The following describes example embodiments of this application in more detail with reference to the accompanying drawings. Although the example embodiments of this application are shown in the accompanying drawings, it should be understood that this application may be implemented in various forms without being limited by the embodiments described herein. On the contrary, these embodiments are provided to have a more thorough understanding of this application, and the scope of this application can be fully communicated to a person skilled in the art.

Terms used in one or more embodiments of this application are explained first.

A two-dimensional code is a pattern in which specific geometric shapes are regularly distributed in black and white on a plane (in a two-dimensional direction) and record data symbol information.

A QR code is an open-source front-end library, and may be a corresponding two-dimensional code generated on a web end based on a specified Uniform Resource Locator (URL) address.

Figure 1:
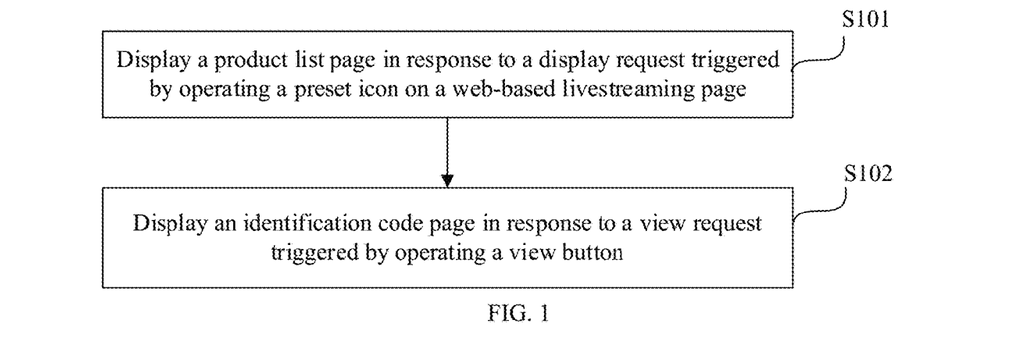
FIG. 1 is a flowchart of a method for displaying a product in livestreaming according to an embodiment of this application.

FIG. 1 is a flowchart of a method for displaying a product in livestreaming according to an embodiment of this application. As shown in FIG. 1, the method includes the following steps.

Step S101: Display a product list page in response to a display request triggered by operating a preset icon on a web-based livestreaming page.

Figure 2:
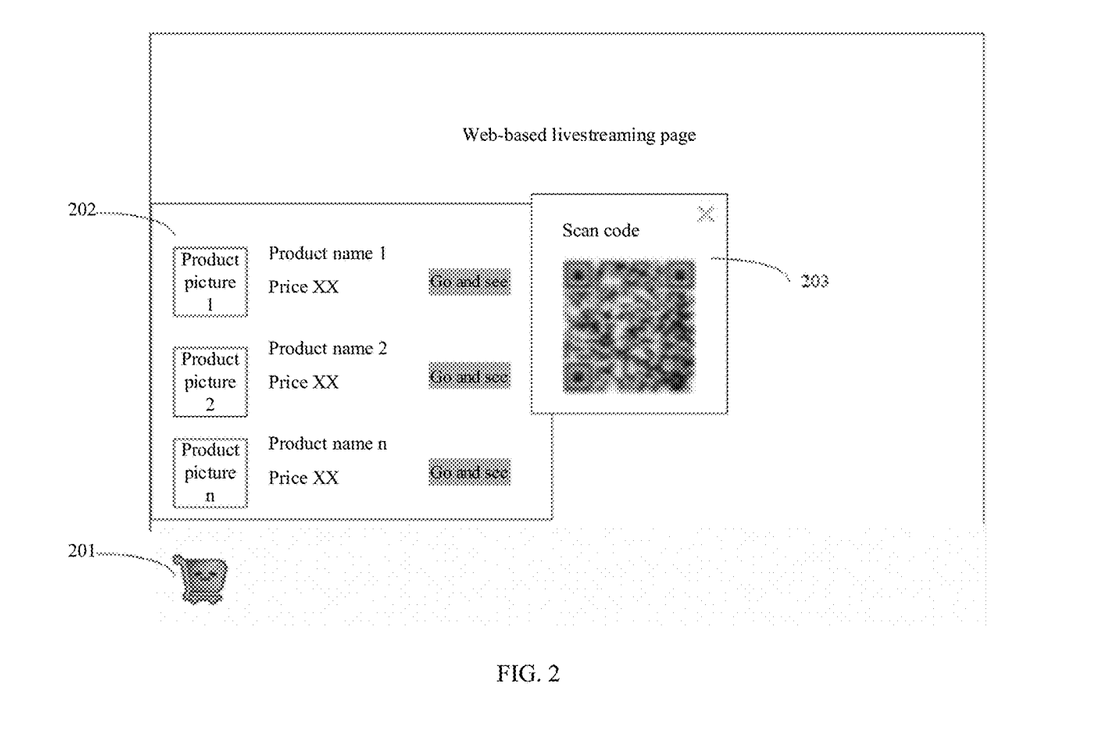
FIG. 2 is a schematic diagram of displaying a product list page and an identification code page on a web-based livestreaming page.

An online streamer may recommend and display a product in a web-based live room, and a user may watch on a web-based livestreaming page of a web-based client computing device (i.e., client). As shown in FIG. 2, the web-based livestreaming page may display the preset icon, for example, a "Cart" icon 201 in a lower left corner to the user. The user may click the "Cart" icon, to provide the user with the product list page, to help the user view each product associated with the live room. The user may view the product list page, to more intuitively learn of the product associated with the live room, so as to improve interest of the user.

Specifically, when the user performs a click operation on the preset icon, for example, the "Cart" icon on the web-based livestreaming page, the product list page may be displayed to the user on the web-based livestreaming page in response to the display request triggered by operating the preset icon. The product list page includes each piece of product information and a view button corresponding to a product. The product list page is shown as a page 202 in a lower left corner in FIG. 2. The product information may include a product name, a product thumbnail, a product price, and the like, or may further include product offer information, product sale information, or the like (not shown in the figure). Specific display content may be set based on an implementation situation. This is not limited herein. The product list page is displayed, so that the user can directly learn of each associated product in the web-based live room. Herein, the product information included on the product list page is related to the live room. Product list pages displayed in a same live room include same product information. In other words, product information included on product list pages displayed to users who enter the web-based live room in different time periods is the same, so that the users who enter the web-based live room in different time periods can view all product information recommended by the online streamer, to prevent the user from omitting viewing of product information when entering the live room late. The view button, for example, a "Go and see" button shown in 202, is in a one-to-one correspondence with the product. Each product corresponds to one view button, so that the user can view product information based on a specific product, or the like. The foregoing is an example for description. The view button is set based on an implementation situation. This is not limited herein.

Further, the user views the displayed product list page, to learn of each piece of product information. If there are a large quantity of products, a progress bar may be set for the product list page, and the progress bar slides up and down to display each piece of product information, or the like.

Step S102: Display an identification code page in response to a view request triggered by operating the view button.

After viewing the product information on the product list page, the user may click the view button corresponding to the product, and may display the identification code page for the view request in response to the view request triggered by operating the view button. As shown in FIG. 2, an identification code page 203 includes an identification code. A two-dimensional code is used as an example for description herein. However, the identification code is not limited to the two-dimensional code. The user may scan the identification code by using, for example, a mobile terminal, and correspondingly enter an application-based livestreaming page, so that traffic is driven from the web-based livestreaming page to the application-based livestreaming page, and the user can perform an operation on the application-based livestreaming page more conveniently.

The application-based livestreaming page and the web-based livestreaming page correspond to each other, and are livestreaming pages of a live room of a same online streamer. In addition to displaying a page of the online streamer, the application-based livestreaming page further displays the product information to the user. The user may continue to complete subsequent operations such as browsing, placing an order, and submitting based on detailed information of the product in a detail page of the displayed product.

According to the method for displaying a product in livestreaming, the product list page is displayed on the web-based livestreaming page, and the product information is displayed to the user, so that the user can intuitively learn of each product in livestreaming, to improve interest of the user in the product. The user may select the product information based on a requirement of the user, and scan, by using the mobile terminal, the displayed identification code to enter the application-based livestreaming page, to drive traffic from web-based livestreaming to application-based livestreaming, and help the user subsequently perform an operation on the application-based livestreaming page.

Figure 3:
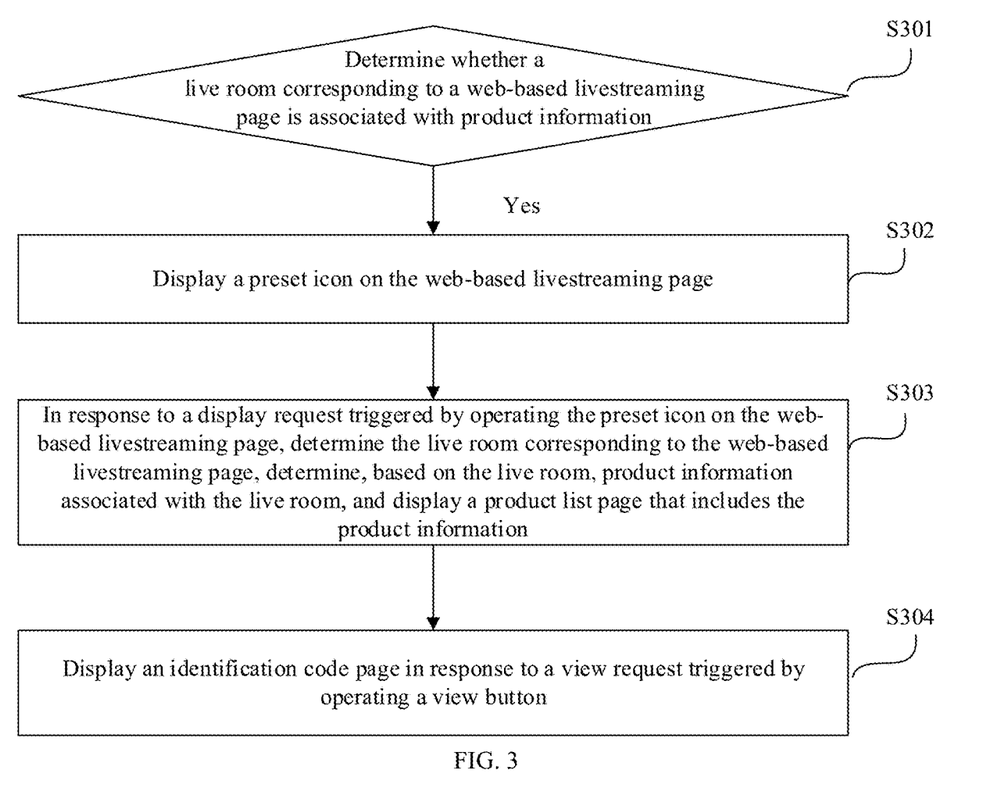
FIG. 3 is a flowchart of a method for displaying a product in livestreaming according to another embodiment of this application.

FIG. 3 is a flowchart of a method for displaying a product in livestreaming according to an embodiment of this application. As shown in FIG. 3, the method includes the following steps.

Step S301: Determine whether a live room corresponding to a web-based livestreaming page is associated with product information.

For the web-based livestreaming page, an online streamer may recommend a product, or may perform game interaction, or the like. In this embodiment, determining is performed for the web-based livestreaming page, to determine whether a live room corresponding to the web-based livestreaming page is associated with product information. When the live room is associated with product information, a subsequent step is performed; or when the live room is not associated with product information, subsequent processing does not need to be performed.

Specifically, when the online streamer recommends the product, recommended product information is associated with a live room in which the product information is located. For example, whether associated product information exists in the live room may be determined by querying a server end. If the associated product information is obtained through querying, it is determined that the live room is associated with product information, and step S302 is performed. The product information may be, for example, a product id. Whether an online live room id is associated with a product id is queried, to determine whether the live room is associated with product information, or the like.

Step S302: Display a preset icon on the web-based livestreaming page.

After it is determined that the live room corresponding to the web-based livestreaming page is associated with product information, the preset icon is displayed on the web-based livestreaming page. A style, a location, or the like of the preset icon may be set based on an implementation situation, to mainly facilitate a user operation. This is not limited herein.

Step S303: In response to a display request triggered by operating the preset icon on the web-based livestreaming page, determine the live room corresponding to the web-based livestreaming page, determine, based on the live room, the product information associated with the live room, and display a product list page that includes the product information.

For example, the user may click the preset icon on the web-based livestreaming page, to trigger the corresponding display request. In response to the display request triggered by the user, the live room corresponding to the web-based livestreaming page is determined based on the display request. If the server end parses the display request, the live room corresponding to the web-based livestreaming page may be determined. Based on the determined live room, the product information associated with the live room is queried and obtained, the product information is returned to the web-based livestreaming page, and the product list page that includes the product information is displayed on the web-based livestreaming page.

Each piece of product information such as a product name, a product picture, a product price, product offer information, or product sale information is displayed on the product list page by using a list. The product list page further includes a view button corresponding to each product, and each view button corresponds to one product. As shown in FIG. 2, the user can clearly learn of each product by intuitively viewing each piece of product information displayed on the product list page, to improve interest of the user, so that traffic is drive from the web-based livestreaming page to an application-based livestreaming page.

Step S304: Display an identification code page in response to a view request triggered by operating the view button.

After viewing the product information on the product list page, the user may slide the product list page to view each piece of product information, and operate the view button corresponding to each product based on a requirement of the user, for example, click the view button, to trigger the view request for the product. The view request is triggered by using the view button. The view button corresponds to the product and the live room. In response to the triggered view request, live room information and a corresponding product information corresponding to the view button can be directly determined. Based on the determined live room information and the corresponding product information, a corresponding identification code, for example, a two-dimensional code in FIG. 2, is generated based on the live room information and the product information by using, for example, a quick response code (QR code), and the identification code is displayed on the identification code page. During generation, the identification code may be generated based on information such as the live room id and the product id. Alternatively, the corresponding identification code may be generated based on the live room information, the product information, and source channel information. The source channel information includes web-based livestreaming, to facilitate determining a source channel through which the user enters the application-based livestreaming page. There may be a plurality of source channels of the application-based livestreaming page. The identification code includes a source channel. When the application-based livestreaming page is entered, a source channel corresponding to the application-based livestreaming page may be determined, and different source channels are conveniently counted. Details are not described herein.

This embodiment is executed on a web-based client of web-based livestreaming, to improve an effect of driving traffic from web-based livestreaming to application-based livestreaming. The user may continue to view the product information based on the application-based livestreaming page, and perform subsequent operations such as placing an order or submitting, to improve a conversion rate.

According to the method for displaying a product in livestreaming provided in this application, when it is determined that the live room corresponding to the web-based livestreaming page is associated with product information, the preset icon is correspondingly displayed on the web-based livestreaming page. The user may trigger the display request based on the operation performed on the preset icon, to display the product information associated with the live room to the user, so that the user can directly and clearly learn of the product information. This is more intuitive and more vivid. The user may select, based on a requirement of the user, a corresponding view button for operating the product, generate the identification code based on the live room information and the product information that are determined by using the view button, and scan the identification code to enter the application-based livestreaming page, so that traffic is driven from web-based livestreaming to application-based livestreaming. Further, the identification code may further include a source channel, to determine that traffic of application-based livestreaming is drive from web-based livestreaming.

Figure 4:
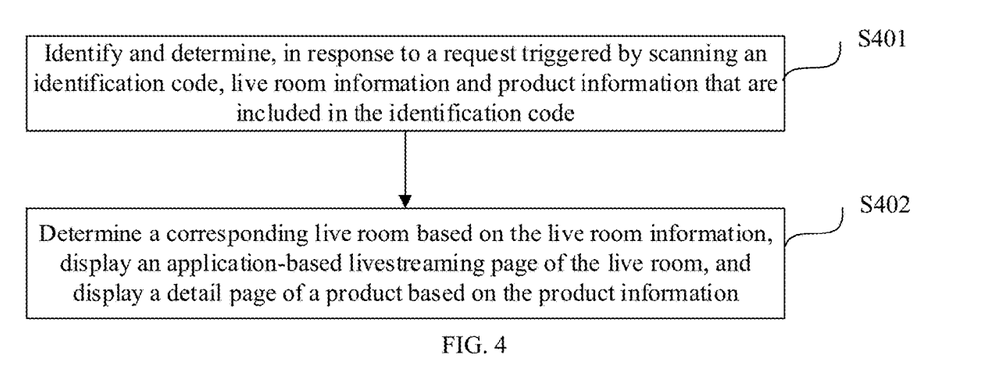
FIG. 4 is a flowchart of a method for displaying a product in livestreaming according to still another embodiment of this application.

FIG. 4 is a flowchart of a method for displaying a product in livestreaming according to an embodiment of this application. As shown in FIG. 4, the method includes the following steps.

Step S401: Identify and determine, in response to a request triggered by scanning an identification code, live room information and product information that are included in an identification code.

This embodiment is executed on an application client of application-based livestreaming, and a user may scan the identification code by using a mobile terminal. In response to a request triggered by the scanning an identification code, the scanned identification code is identified, to determine the live room information and the product information that are included in the identification code. The live room information and the product information that are obtained by identifying the scanned identification code are live room information of the user on a web-based livestreaming page and product information selected by the user on the web-based livestreaming page. The live room information may include a live room id, or the like, and the product information may include a product id, or the like.

Further, different users may scan the identification code by using respective application clients. In this embodiment, when the identification code is scanned, login user verification on the user is blocked, and whether a login user of application-based livestreaming and a login user of web-based livestreaming are a same user. Any user may scan the identification code, to obtain the live room information and the product information, so as to enter an application-based livestreaming page, and magnify an effect of driving traffic from web-based livestreaming to application-based livestreaming.

Step S402: Determine a corresponding live room based on the live room information, display an application-based livestreaming page of the live room, and display a detail page of a product based on the product information.

A url address of application-based livestreaming corresponding to the live room may be determined based on the live room information obtained based on the identification code. A url address of each live room corresponds to the live room, and may be obtained from, for example, a server end, and the application-based livestreaming page of the live room is displayed based on the url address. In addition to displaying the application-based livestreaming page on the application client, detailed information of the product may be further determined based on the product information. For example, the detailed information of the product such as a product picture, a product name, or a product description is obtained through a search based on the product id in the product information. A detail page that is of the product and that includes the detailed information of the product is displayed on the application-based livestreaming page, for example, is displayed on the application-based livestreaming page in a form such as a floating window or a page, for example, occupies a half of the application-based livestreaming page. This is not limited herein. The user may view the detail page of the product. The detailed information of the product is displayed, so that the user learns of the product in more detail, to improve interest of the user in the product, and help the user perform a subsequent operation such as placing an order, submitting, or make a purchase.

In the method for displaying a product in livestreaming provided in this application, the live room information and the product information that are included in the identification code are obtained through identification based on the request triggered by scanning the identification code, the application-based livestreaming page may be directly entered, and the detail page of the product is displayed on the application-based livestreaming page, so that the user learns of the product in more detail, to improve interest of the user. Further, after the request is triggered by scanning the identification code, login user verification on the user is blocked, and any user can enter the application-based livestreaming page by scanning the identification code, to magnify the effect of driving traffic from web-based livestreaming to application-based livestreaming.

Figure 5:
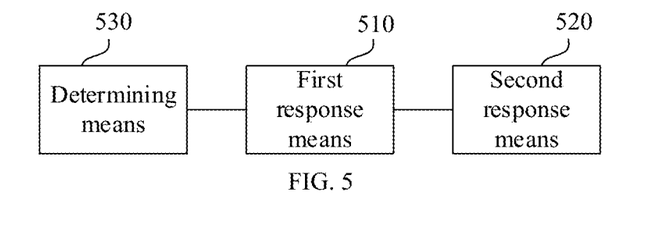
FIG. 5 is a schematic diagram of a structure of a web-based client for displaying a product in livestreaming according to an embodiment of this application.

FIG. 5 is a schematic diagram of a structure of a web-based client for displaying a product in livestreaming according to an embodiment of this application. As shown in FIG. 5, the web-based client includes:
  a first response means 510, configured to display a product list page in response to a display request triggered by operating a preset icon on a web-based livestreaming page, where the product list page includes product information and a view button corresponding to a product; and
  a second response means 520, configured to display an identification code page in response to a view request triggered by operating the view button, where the identification code page includes an identification code, so that a mobile terminal scans the identification code and enters a corresponding application-based livestreaming page, and the application-based livestreaming page further displays a detail page of the product.

Optionally, the first response means 510 is further configured to:
  determine a live room corresponding to the web-based livestreaming page in response to the display request triggered by operating the preset icon on the web-based livestreaming page; and
  determine, based on the live room, product information associated with the live room, and display a product list page that includes the product information, where the product list page further includes a view button corresponding to a product.

Optionally, the product information included on the product list page is related to the live room, and product list pages displayed in a same live room include same product information.

Optionally, the web-based client further includes:
  a determining means 530, configured to: determine whether the live room corresponding to the web-based livestreaming page is associated with product information; and display the preset icon on the web-based livestreaming page if the live room corresponding to the web-based livestreaming page is associated with product information.

Optionally, the second response means 520 is further configured to:
  determine live room information and corresponding product information in response to the view request triggered by operating the view button corresponding to the product; and
  generate a corresponding identification code based on the live room information and the product information, and display the identification code on the identification code page.

Optionally, the second response means 520 is further configured to:
  generate the corresponding identification code based on the live room information, the product information, and source channel information, and display the identification code on the identification code page, where the source channel information includes web-based livestreaming.

For descriptions of the means, refer to corresponding descriptions in the method embodiments. Details are not described herein again.

According to the web-based client for displaying a product in livestreaming provided in this application, the product list page is displayed on the web-based livestreaming page, and the product information is displayed to the user, so that the user can intuitively learn of each product in livestreaming, to improve interest of the user in the product. The user may select the product information based on a requirement of the user, and scan the displayed identification code to enter the application-based livestreaming page, to drive traffic from web-based livestreaming to application-based livestreaming, and help the user subsequently perform an operation on the application-based livestreaming page.

Figure 6:
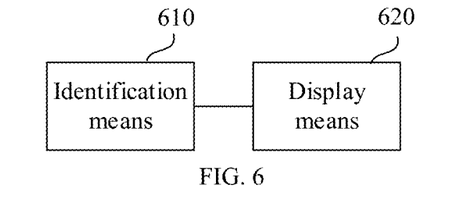
FIG. 6 is a schematic diagram of a structure of an application client for displaying a product in livestreaming according to an embodiment of this application.

FIG. 6 is a schematic diagram of a structure of an application client for displaying a product in livestreaming according to an embodiment of this application. As shown in FIG. 6, the application client includes:
  an identification means 610, configured to identify and determine, in response to a request triggered by scanning an identification code, live room information and product information that are included in the identification code; and
  a display means 620, configured to: determine a corresponding live room based on the live room information, display an application-based livestreaming page of the live room, and display a detail page of a product based on the product information, where the detail page is displayed on the application-based livestreaming page.

Optionally, the display means 620 is further configured to:
  determine a url address of application-based livestreaming corresponding to the live room based on the live room information, and display the application-based livestreaming page of the live room based on the url address; and
  determine detailed information of the product based on the product information, and display a detail page that is of the product and that includes the detailed information of the product.

Optionally, the identification means 610 is further configured to:
  in response to the request triggered by scanning the identification code, block login user verification on a user, and identify and determine the live room information and the product information that are included in the identification code.

According to the application client for displaying a product in livestreaming provided in this application, the live room information and the product information that are included in the identification code are obtained through identification based on the request triggered by scanning the identification code by the user, the application-based livestreaming page may be directly entered, and the detail page of the product is displayed on the application-based livestreaming page, so that the user learns of the product in more detail, to improve interest of the user. Further, after the request is triggered by scanning the identification code, login user verification on the user is blocked, and any user can enter the application-based livestreaming page by scanning the identification code, to magnify the effect of driving traffic from web-based livestreaming to application-based livestreaming.

This application further provides a nonvolatile computer storage medium. The computer storage medium stores at least one executable instruction, and the executable instruction may be used to perform the method for displaying a product in livestreaming in any one of the method embodiments.

Figure 7:
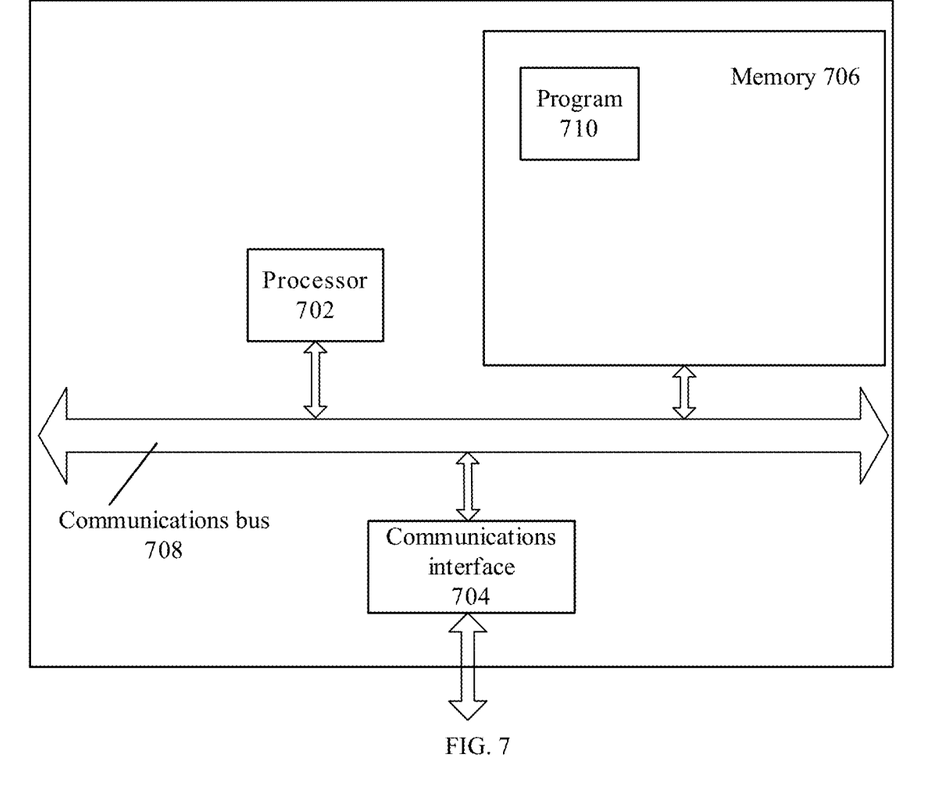
FIG. 7 is a schematic diagram of a structure of a computing device according to an embodiment of this application.

FIG. 7 is a schematic diagram of a structure of a computing device according to an embodiment of this application. A specific implementation of the computing device is not limited by a specific embodiment of this application.

As shown in FIG. 7, the computing device may include a processor 702, a communications interface 704, a memory 706, and a communications bus 708.

The processor 702, the communications interface 704, and the memory 706 complete mutual communication through the communications bus 708.

The communications interface 704 is configured to communicate with another device such as a client or a network element such as another server.

The processor 702 is configured to execute a program 710, and may specifically perform related steps in the embodiments of the method for displaying a product in livestreaming.

Specifically, the program 710 may include program code, and the program code includes computer operation instructions.

The processor 702 may be a central processing unit (CPU), an application specific integrated circuit (ASIC), or one or more integrated circuits configured to implement this application. One or more processors included in the computing device may be processors of a same type, for example, one or more CPUs, may also be processors of different types, for example, one or more CPUs and one or more ASICs.

The memory 706 is configured to store the program 710. The memory 706 may include a high-speed RAM memory, and may further include a nonvolatile memory, for example, at least one magnetic disk storage.

The program 710 may be specifically configured to enable the processor 702 to perform the method for displaying a product in livestreaming in any one of the method embodiments. For a specific implementation of each step in the program 710, refer to corresponding descriptions in corresponding steps and units in the product display embodiments. Details are not described herein again. It may be clearly understood by a person skilled in the art that, for convenience and brevity of the descriptions, for a detailed working process of the foregoing device and means, refer to corresponding process descriptions in the method embodiments. Details are not described herein again.

The algorithms or displays provided herein are not inherently related to any particular computer, virtual system, or another device. Various common systems may also be used with demonstrations herein. According to the foregoing descriptions, the required structure to construct such a system is obvious. In addition, this application is not specific to any specific programming language. It should be understood that the content of this application described herein may be implemented by using various programming languages, and the foregoing description of a specific language is intended to disclose a preferred implementation of this application.

The specification provided herein describes a large quantity of specific details. However, it can be understood that the embodiments of this application may be practiced without these specific details. In some instances, well-known methods, structures, and techniques are not shown in detail to not obscure the understanding of this specification.

Similarly, it should be understood that, to simplify this application and help understand one or more of the aspects of the present invention, in the foregoing description of the example embodiments of this application, features of this application are sometimes grouped together into an individual embodiment, diagram, or description thereof. However, the disclosed method should not be construed as reflecting the following intention: The application that requires protection requires more features than those expressly recorded in each claim. More specifically, as reflected in the following claims, aspects of the invention lie in less than all the features of the previously disclosed individual embodiments. Therefore, claims that follow a specific implementation are expressly incorporated herein by reference, and each claim is used as a separate embodiment of this application.

A person skilled in the art may understand that means in a device in an embodiment may be adaptively changed and disposed in one or more devices that are different from that in the embodiment. Means, units, or components in embodiments may be combined into one means, unit, or component, and in addition, may be divided into a plurality of submeans, subunits, or subcomponents. In addition to such features and/or processes or at least some of the units are mutually exclusive, any combination may be used to combine all the features disclosed in this specification (including accompanying claims, abstracts, and drawings) as well as all the processes or units of any disclosed method or device. Unless otherwise expressly stated, each feature disclosed in this specification (including accompanying claims, abstracts, and drawings) may be replaced by an alternative feature providing the same, equivalent, or similar objective.

In addition, a person skilled in the art can understand that, although some embodiments herein include some features included in another embodiment rather than another feature, combinations of features of different embodiments mean that the features fall within the scope of this application and form different embodiments. For example, in the following claims, any one of the embodiments that require protection may be used in any combination manner.

The embodiments of components in this application may be implemented by using hardware, or may be implemented by using a software means running on one or more processors, or a combination thereof. A person skilled in the art should understand that in practice, a microprocessor or a digital signal processor (DSP) may be used to implement some or all functions of some or all components according to this application. This application may further be implemented as a part or all of a device or apparatus program (for example, a computer program and a computer program product) used to perform the method described herein. Such a program for implementing this application may be stored in a computer-readable medium, or may have a form of one or more signals. Such signals may be downloaded from the Internet site, provided on carrier signals, or provided in any other form.

It should be noted that the foregoing embodiments describe this application rather than limiting this application, and a person skilled in the art may design an alternative embodiment without departing from the scope of appended claims. In the claims, any reference symbols between brackets should not be constructed to limit the claims. The word "include" does not preclude the existence of elements or steps not listed in the claims. The word "a/an" or "one" before the element does not preclude the existence of a plurality of such elements. This application may be implemented by using hardware including several different elements and by using appropriately programmed computers. In the claims of enumerating units of several apparatuses, several units of these apparatuses may be specifically embodied by using a same hardware item. Use of the words such as "first", "second", and "third" does not indicate any order. These words can be interpreted as names. The steps in the foregoing embodiments should not be construed as a limitation on an execution sequence except for special description.

What is claimed is:

1. A method for displaying products in livestreaming, comprising:
    displaying a first interface in response to a display request triggered by operating a preset icon on a web-based livestreaming page, wherein the first interface comprises product information and at least one graphical interface view button corresponding to at least one product; and
    displaying a second interface in response to a view request triggered by operating the at least one graphical interface view button, wherein the second interface comprises an identification code, wherein the identification code is configured to be scanned by a mobile terminal and causes the mobile terminal to directly access an application-based livestreaming page corresponding to the web-based livestreaming page, and wherein the application-based livestreaming page and the web-based livestreaming page are associated with a live room of a same online streamer and displaying additional information of the at least one product without requiring user login or re-authentication.

2. The method according to claim 1, wherein the displaying a first interface in response to a display request triggered by operating a preset icon on a web-based livestreaming page further comprises:
    determining the live room corresponding to the web-based livestreaming page in response to the display request triggered by operating the preset icon on the web-based livestreaming page;
    determining, based on the live room, product information associated with the live room; and
    displaying the first interface that comprises the product information and a view button corresponding to each product associated with the live room.

3. The method according to claim 1, wherein the product information on the first interface corresponds to the live room.

4. The method according to claim 1, wherein before the displaying a first interface in response to a display request triggered by operating a preset icon on a web-based livestreaming page, the method further comprises:
    determining whether the live room corresponding to the web-based livestreaming page is associated with any product information; and
    displaying the preset icon on the web-based livestreaming page in response to determining that the live room is associated with the product information.

5. The method according to claim 1, further comprising:
    determining live room information and product information in response to a view request triggered by operating a view button corresponding to a product;
    generating the identification code based on the live room information and the product information; and
    displaying the second interface comprising the identification code.

6. The method according to claim 5, further comprising:
    generating the identification code based on the live room information, the product information, and information indicative of a source channel, wherein the source channel comprises web-based livestreaming.

7. A method for displaying products in livestreaming, comprising:
    identifying and determining, in response to a request triggered by scanning an identification code displayed in a second interface, live room information and product information based on the identification code;
    determining a live room based on the live room information;
    directly accessing and displaying an application-based livestreaming page of the live room; and
    displaying an interface associated with a product based on the product information, wherein the interface comprises detailed information of the product, and wherein the interface is displayed on the application-based livestreaming page without requiring user login or re-authentication.

8. The method according to claim 7, further comprising:
    determining a Uniform Resource Locator (URL) address of application-based livestreaming corresponding to the live room based on the live room information;
    displaying the application-based livestreaming page of the live room based on the URL address; and
    determining the detailed information of the product based on the product information; and
    displaying the interface comprising the detailed information of the product.

9. The method according to claim 7, further comprising:
    in response to the request triggered by scanning the identification code, blocking verification of login user.

10. A computing device, comprising a processor, a memory, wherein the memory comprises computer-readable instructions that upon execution by the processor cause the processor to perform operations comprising:
    displaying a first interface in response to a display request triggered by operating a preset icon on a web-based livestreaming page, wherein the first interface comprises product information and at least one graphical interface view button corresponding to at least one product; and
    displaying a second interface in response to a view request triggered by operating the at least one graphical interface view button, wherein the second interface comprises an identification code, wherein the identification code is configured to be scanned by a mobile terminal and causes the mobile terminal to directly access an application-based livestreaming page corresponding to the web-based livestreaming page, and wherein the application-based livestreaming page and the web-based livestreaming page are associated with a live room of a same online streamer and displaying additional information of the at least one product without requiring user login or re-authentication.

11. The computing device according to claim 10, wherein the displaying a first interface in response to a display request triggered by operating a preset icon on a web-based livestreaming page further comprises:
   determining the live room corresponding to the web-based livestreaming page in response to the display request triggered by operating the preset icon on the web-based livestreaming page;
   determining, based on the live room, product information associated with the live room;
   and displaying the first interface that comprises the product information and a view button corresponding to each product associated with the live room.

12. The computing device according to claim 10, wherein the product information on the first interface corresponds to the live room.

13. The computing device according to claim 10, wherein before the displaying a first interface in response to a display request triggered by operating a preset icon on a web-based livestreaming page, the method further comprises:
   determining whether the live room corresponding to the web-based livestreaming page is associated with any product information; and
   displaying the preset icon on the web-based livestreaming page in response to determining that the live room is associated with the product information.

14. The computing device according to claim 10, the operations further comprising:
   determining live room information and product information in response to a view request triggered by operating a view button corresponding to a product;
   generating the identification code based on the live room information and the product information; and
   displaying the second interface comprising the identification code.

15. The computing device according to claim 14, the operations further comprising:
   generating the identification code based on the live room information, the product information, and information indicative of a source channel, wherein the source channel comprises web-based livestreaming.

16. A non-transitory computer-readable storage medium, storing computer-readable instructions that upon execution by a processor cause the processor to implement operations comprising:
   displaying a first interface in response to a display request triggered by operating a preset icon on a web-based livestreaming page, wherein the first interface comprises product information and at least one graphical interface view button corresponding to at least one product; and
   displaying a second interface in response to a view request triggered by operating the at least one graphical interface view button, wherein the second interface comprises an identification code, wherein the identification code is configured to be scanned by a mobile terminal and causes the mobile terminal to directly access an application-based livestreaming page corresponding to the web-based livestreaming page, and wherein the application-based livestreaming page and the web-based livestreaming page are associated with a live room of a same online streamer and displaying additional information of the at least one product without requiring user login or re-authentication.

17. The non-transitory computer-readable storage medium according to claim 16, wherein the displaying a first interface in response to a display request triggered by operating a preset icon on a web-based livestreaming page further comprises:
   determining the live room corresponding to the web-based livestreaming page in response to the display request triggered by operating the preset icon on the web-based livestreaming page;
   determining, based on the live room, product information associated with the live room; and
   displaying the first interface that comprises the product information and a view button corresponding to each product associated with the live room.

18. The non-transitory computer-readable storage medium according to claim 16, wherein before the displaying a first interface in response to a display request triggered by operating a preset icon on a web-based livestreaming page, the method further comprises:
   determining whether the live room corresponding to the web-based livestreaming page is associated with any product information; and
   displaying the preset icon on the web-based livestreaming page in response to determining that the live room is associated with the product information.

19. The non-transitory computer-readable storage medium according to claim 16, the operations further comprising:
   determining live room information and product information in response to a view request triggered by operating a view button corresponding to a product;
   generating the identification code based on the live room information and the product information; and
   displaying the second interface comprising the identification code.

20. The non-transitory computer-readable storage medium according to claim 19, the operations further comprising:
   generating the identification code based on the live room information, the product information, and information indicative of a source channel, wherein the source channel comprises web-based livestreaming.

* * * * *